UNITED STATES PATENT OFFICE.

GUSTAVE CLAUDON AND CHARLES VIGREUX, OF PARIS, FRANCE.

PROCESS OF PRODUCTION AND COLLECTION OF FERTILE YEAST FROM JUICES OF GRAINS, &c.

SPECIFICATION forming part of Letters Patent No. 279,337, dated June 12, 1883.

Application filed April 17, 1883. (No specimens.) Patented in France October 6, 1882, No. 151,432; in Belgium October 7, 1882, No. 59,212, and in Luxemburg October 17, 1882, No. 227.

*To all whom it may concern:*

Be it known that we, GUSTAVE CLAUDON and CHARLES VIGREUX, both of Paris, France, have invented an improved process for the production and collection of fertile yeast from the saccharine juices of grain, molasses, and beet-root; and we do hereby declare that the following is a full, clear, and exact description of the same; and we further declare that we have received Letters Patent of the following countries for said invention, to wit: Letters Patent of Luxemburg, for fifteen years, dated October 17, 1882, No. 227; Letters Patent of France, for fifteen years, dated October 6, 1882, No. 151,432; Letters Patent of Belgium, for fifteen years, dated October 7, 1882, No. 59,212.

This invention relates to an improved process for the production and collection of fertile yeast in distilleries from the saccharine juices of grain, molasses, and beet-root. It is known that the fermentation of wort of grain saccharified under pressure by means of acids will not furnish a fertile yeast capable of being collected and utilized if such fermentation be performed with turbid wort. This is the fact even if fermentation takes place at a low temperature, (15° to 20° centigrade.) On the other hand, it is also known that worts of molasses in which fermentation is set up do not produce a fertile yeast capable of being collected and utilized. The result is the same in this case also if the fermentation takes place at a low temperature, (15° to 20° centigrade,) instead of at the temperature ordinarily employed, (25° to 30° centigrade.) In most distilleries of molasses there is added to the wort the juice of grain, mostly that of maize, saccharified by means of acids in proportion equivalent to half the total weight of the yeast of beer, which would be necessary to determine the complete alcoholic fermentation of such worts. This addition is chiefly intended to lessen the ill effects of the alteration to which brewers' yeast, as bought, is subject, and to furnish a pure yeast to said wort fed from the elements of the grain. Moreover, it is known that the yeast thus furnished by the grain falls to the bottom of the vat, and that by producing the fermentation at the usual temperature (25° to 30° centigrade) no fertile yeast can be collected.

This invention consists in a process of producing from mixed worts of grain and molasses a fertile yeast, which is as active as the best beer-yeast, and is capable of being collected, during the fermentation, for sale or for use for producing fermentation (at the ordinary temperature of 25° to 30° centigrade) of other similar worts. To attain this result we proceed as follows:

First. We prepare a wort from molasses, to which we add juice of grain (saccharified by means of acids) in the ordinary proportions above specified. This is the ordinary mixed wort of distilleries in which grain mixed with molasses is employed. This mixed wort is of the ordinary density and acidity.

Second. We commence the preparation of the fermenting-vat in the ordinary way by diluting a quantity of yeast generally used in such distilleries in a portion of this mixed wort. This mixture is brought to 25° centigrade to commence with, and the vat is then gradually filled up with the rest of the mixed wort.

Third. When the fermentation has become fully active—say about two hours before the vat is completely filled—the temperature of the wort is brought down gradually to 18° centigrade by causing a current of cold water to circulate through a refrigerator within the vat, this refrigeration of the wort being effected concurrently with the filling up of the vat.

Fourth. This temperature of about 18° centigrade is maintained constant until the whole crop of fertile yeast produced during this fourth period has been collected. The collection of the yeast is commenced at about the middle of the total duration of the fermentation. The crop of yeast may be collected by skimming and placed to drain upon loose frames clothed with cloth and placed above the vat.

Fifth. The yeast having been collected, the fermentation may be allowed to terminate by arresting the circulation of cold water; but it is advantageous to stimulate the fermentation in order to reduce its total duration, and to this end we afterward substitute a current of hot water or steam for the cold water in the worm, so as to gradually raise the temperature of the wort to 26° or 27° centigrade.

Sixth. The fermentation is then completed under the ordinary conditions obtaining in distilleries of molasses.

In order to ascertain precisely the best practical working conditions, experiments have been made upon about one hundred and ninety thousand kilos of molasses, to which were added about thirteen thousand five hundred kilos of maize, saccharified by acid, the proportions of acid and grain and the density of the wort and the temperature maintained during the formation of the yeast being varied. Thus quantities of ninety-four hectoliters and three hundred and thirty hectoliters of wort, respectively, were operated on at one time. From these experiments the following conclusions have been deduced:

First. As regards the quantity of yeast obtained per one thousand kilos of molasses in fermentation, the best proportions for the maize and molasses are to mix the juice of one hundred and fifty kilos of maize, saccharified by means of acid, with two thousand one hundred and fifty kilos of molasses. If the proportions of grain be increased without reducing the temperature of the fermentation, the quantity of fertile yeast produced becomes reduced to about two-thirds. If, on the other hand, the proportion of grain be diminished without changing the temperature of fermentation, the yield of yeast remains about the same; but the time required for its production, and consequently the duration of the fermentation, is notably increased.

Second. An initial acidity of three thousandths would appear to be most suitable as well for the production of yeast as for reducing to a minimum the formation of organic acids to the detriment of the yield in alcohol. This initial acidity therefore corresponds to the maximum production of alcohol.

Third. The initial density should be about 7.50° Baumé, a higher or lower density being disadvantageous, both as regards the production of yeast and the yield in alcohol.

Fourth. Other things beings the same, in order to obtain a fertile yeast in abundance and of good quality without prolonging too much the duration of the fermentation, it is necessary that the temperature of the worts should be maintained between 17° and 19° centigrade, and as near 18° as possible, until the yeast has been collected.

Fifth. Other things being the same, the yield of fertile yeast per one thousand kilos of molasses is higher in a vat of ninety-four hectoliters of wort than in one of three hundred and thirty hectoliters. Thus while vats of three hundred and thirty hectoliters have produced an average of 26.50 kilos of pressed yeast at forty per cent. of water per one thousand kilos of molasses, vats of ninety-four hectoliters have produced an average of 35.30 kilos, or thirty-three per cent. more.

Sixth. All other conditions remaining the same, the quantity of fertile yeast obtained varies with the nature of the molasses—that is to say, with the abundance of the matters it holds in suspension—the purest molasses giving in this respect the best results. Thus the old bottoms of the vats or troughs are unfit to be used for the production of yeast.

Seventh. The total duration of the fermentation from its commencement of the formation in the vat averages from ninety-seven to ninety-eight hours.

*Qualities and applications of the yeast obtained by this improved process.*—First. Examined under a microscope this yeast presents all the appearance of fresh brewers' yeast, being composed almost entirely of ovoid translucid cells without granulation (even when magnified to six hundred diameters.) These indications are those of a very good mature fresh yeast, most suitable for budding or developing the cells.

Second. This yeast, when dried with care at 100°, yields seven or eight per cent. of ash—*i. e.*, the same as brewers' yeast.

Third. With an equal quantity of water, this yeast has the same strength as good freshly-gathered brewers' yeast.

Fourth. It may be used instead of brewers' yeast to form a vat prepared for the production of fertile yeast. This process, therefore, renders continuous fermentation possible; but owing to the law which governs the reproduction of all species, the ferment would become degenerated; and it is therefore preferable to employ brewers' yeast to prepare the vat in which the fertile yeast is to be produced.

Fifth. The yeast may be employed in all cases and in place of brewers' yeast for the fermentation of the juices of molasses alone, of grain alone, or of beet molasses and grain. It may also be employed in bread-making.

To sum up, this improved process for the manufacture of fertile yeast is based on the following principles: First, the addition to worts of molasses of a suitable proportion of the juice of grain saccharified by acid places said juices in the condition of clear worts; second, this addition completes the elements of the molasses as regards the production of fertile yeast; third, these two conditions being fulfilled, the refrigeration of the worts and their maintenance at a temperature approaching 18° centigrade, the combination of these three conditions places the mixed worts in the best conditions for the production of an abundance of fertile yeast of excellent quality; fourth, in order not to unnecessarily prolong the fermention after the collection of the yeast the worts are reheated to bring them up to a temperature of 26° or 27° centigrade, which is that of ordinary distillers' worts.

We claim—

1. The process herein described of producing yeast, which process consists in first preparing wort from molasses, next adding the juice of saccharified grain thereto, in then diluting in part of the said mixture some ordinary yeast, in then adding the balance of the mixed wort and grain juice and letting the mixture ferment, at the same time chilling it, in then skimming off the yeast and in then ceasing the chilling and allowing the fermentation to terminate, substantially as specified.

2. The herein-described process for the production and collection of fertile yeast from mixed worts in distilleries, which process consists in reheating the wort by heating the vat after the collection of the yeast, and while the process of fermentation is being terminated, as and for the purposes specified.

3. The herein-described process, which consists in first chilling the vat which contains the wort, and in subsequently reheating the same to obtain a fertile yeast capable of being collected and used substantially as specified.

G. CLAUDON.
C. VIGREUX.

Witnesses:
ROBT. M. HOOPER,
ALBERT MOREAU.